United States Patent

[11] 3,607,635

| [72] | Inventors | Charles C. Ripley;<br>Gerald L. O'Neill, both of San Jose, Calif. |
|---|---|---|
| [21] | Appl. No. | 720,320 |
| [22] | Filed | Apr. 10, 1968 |
| [45] | Patented | Sept. 21, 1971 |
| [73] | Assignee | General Electric Company |

[54] NUCLEAR REACTOR WITH VARIABLE FLOW STEAM CIRCULATOR
2 Claims, 5 Drawing Figs.

[52] U.S. Cl. .................................................. 176/56,
    176/55, 261/62, 261/118, 122/459
[51] Int. Cl. ............................................. G21c 15/24
[50] Field of Search ........................................ 176/54, 55,
    56; 261/DIG. 13, DIG. 32, 118; 122/459

[56] References Cited
UNITED STATES PATENTS
3,414,473  12/1968  Schluderberg et al. ....... 176/56

*Primary Examiner*—Reuben Epstein
*Attorneys*—Ivor J. James, Jr., Samuel E. Turner, John R. Duncan, Frank L. Neuhauser, Oscar B. Waddell and Melvin M. Goldenberg ABSTRACT: A steam cooled nuclear reactor power plant having an improved thermopresser capable of part load operation. In a steam thermopresser in which water droplets are injected into flowing superheated steam, a system is provided by which waterflow can be decreased as steam flow decreases, while maintaining an optimum thermopresser throat configuration at any flow rate.

INVENTORS:
CHARLES C. RIPLEY
GERALD L. O'NEILL

BY: *John R. Duross*
ATTORNEY

NUCLEAR REACTOR WITH VARIABLE FLOW STEAM CIRCULATOR

BACKGROUND OF THE INVENTION

Recently, a device called the "aerothermopresser" has been developed for use, typically, in improving the efficiency of gas turbines. The aerothermopresser includes a short, narrow cylindrical throat section attached to the turbine exhaust with a diverging generally conical section attached to the throat section. Means are provided to inject water into the flowing exhaust gases at the narrow throat section. The water evaporates, increasing the stagnation pressure at the aerothermopresser exit, improving the efficiency of the gas turbine. The aerothermopresser is described in further detail of A. H. Shapiro et al., in an article entitled "The Aerothermopresser—A Device for Improving the Performance of a Gas Turbine Power Plant," Transactions of ASME, Apr. 1956, pp. 617–653.

Still more recently, a somewhat similar device, called the "steam thermopresser" has been developed for use in a steam-circulating system. The steam thermopresser includes, in seriatim, a generally conical converging inlet section, a short throat section and a generally conical diverging diffuser section. Means are provided to inject water as very fine droplets into the thermopresser at the throat section. Superheated steam is fed into the inlet section and through the thermopresser. As the superheated steam accelerates through the converging inlet, a drop in pressure occurs. The pressure recovery during deceleration in the diffuser section, as the density of the flowing steam is increased by the injected water which evaporates while desuperheating the superheated steam, is substantially greater than the pressure drop required for the acceleration process. Thus, a net increase in the stagnation pressure will have occurred. This system is further detailed in D. P. Hines' copending application Ser. No. 701,228, filed Jan. 29, 1968.

As is further described in said copending patent application, this system is highly effective as the steam-coolant-circulating means in a steam-cooled nuclear reactor.

A large quantity of superheated steam is required for full capacity operation of a steam thermopresser. During startup of a steam-cooled nuclear reactor or other system requiring superheated steam circulation, this large quantity may not be available. Under these circumstances, the steam thermopresser may be operated as a jet pump, with a single large centerline nozzle upstream of the thermopresser throat supplying driving fluid. Such a system is detailed by C. C. Ripley in copending application Ser. No. 701,229, filed Jan. 29, 1968.

Steam-circulating systems using the steam thermopresser are highly efficient, especially since there is no requirement that large quantities of steam be directly pumped, as is required by the widely used "Loeffler" system. However, further improvements in the system can be achieved. Problems remain in operating a steam thermopresser at part load. Where the flow of superheated steam through the thermopresser is decreased, the water-evaporating capacity decreases. If the flow of injected water is not properly adjusted, excessive water may be entrained in the saturated steam leaving the thermopresser. Also, the configuration of the thermopresser inlet and throat sections which are optimized for full capacity flow will not be optimum for lower flow rates. Similarly, an inlet and throat design which is optimum for thermopresser operation may not be suitable for jet pump operation during system startup.

Thus, there is a continuing need for improvements in steam thermopressers to permit variable load operation.

SUMMARY OF THE INVENTION

It is, therefore, an object of this invention to provide a steam thermopresser which overcomes the above-noted problems.

Another object of this invention is to provide a steam thermopresser capable of efficient operation over a wide range of steam flow.

Another object of this invention is to provide a steam thermopresser system especially suitable for circulating steam in a steam-cooled nuclear reactor.

Still another object of this invention is to provide a steam-circulating system which operates efficiently as both a steam thermopresser and a jet pump.

Yet another object of this invention is to provide variable configuration inlet and throat sections for a steam thermopresser.

The above objects, and others, are accomplished in accordance with this invention by providing a thermopresser in which the water-injecting means is in the form of an axially movable toroidal manifold within the thermopresser inlet section. Waterflow through spray nozzles on the manifold may be adjusted in accordance with superheated steam flow into the thermopresser. As the manifold ring is moved forward, toward the thermopresser throat, it decreases the throat cross-sectional area. Finally, the manifold contacts the thermopresser wall near the throat section. This permits steam flow only within the toroidal manifold which now acts as the thermopresser inlet wall. Thus, the thermopresser inlet wall may be designed for optimum full load operation and the inside surface of the toroidal manifold may be designed as an optimum inlet surface for part load operation. This system is highly effective in a steam-cooled nuclear reactor powerplant, since the load may be desirably varied over a substantial range.

BRIEF DESCRIPTION OF THE DRAWINGS

Details of the invention, together with various preferred embodiments thereof, will become further apparent upon reference to the drawings, wherein.

DETAILED DESCRIPTION OF THE INVENTION

Figure 1A:
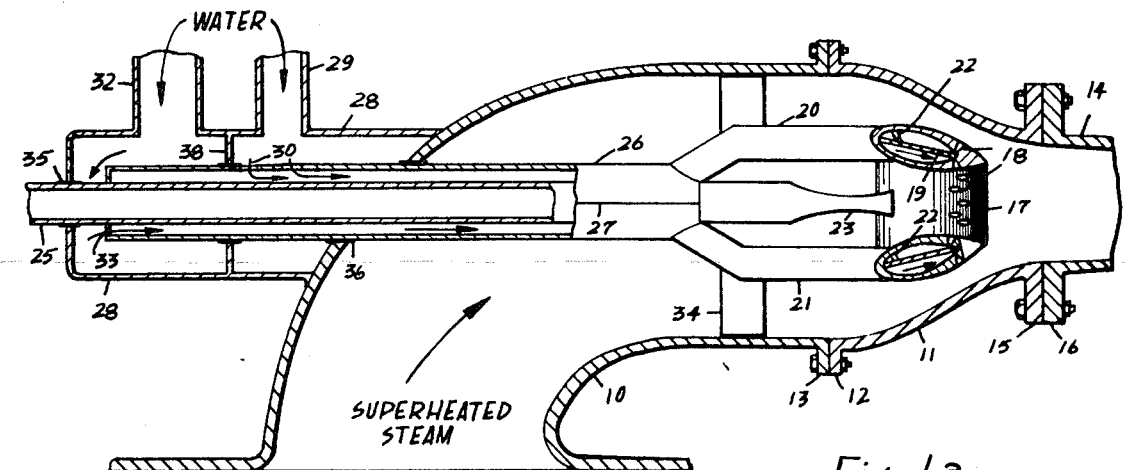
FIG. 1a shows a schematic representation, in section, of a thermopresser according to this invention arranged for full load operation.
Figure 1B:
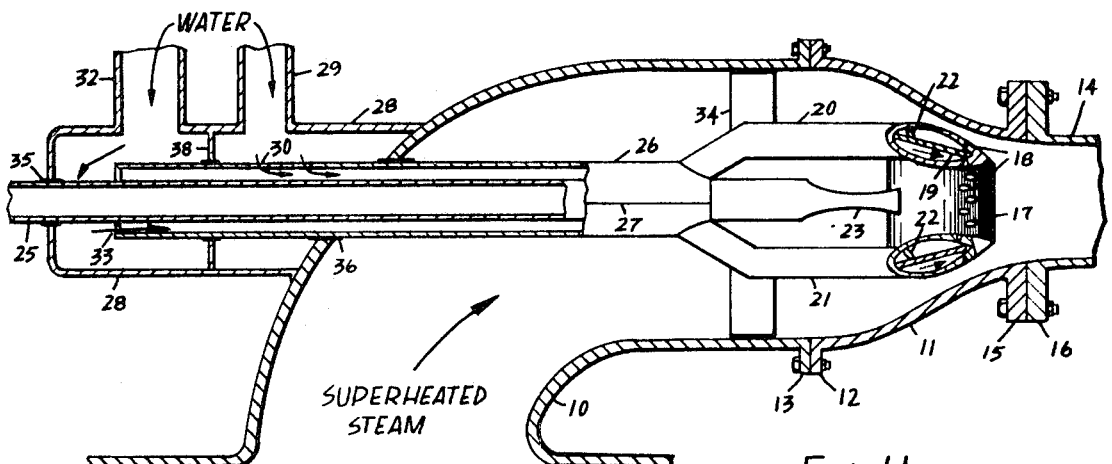
FIG. 1b shows the thermopresser shown in FIG. 1a arranged for ⅔-load operation.
Figure 1C:
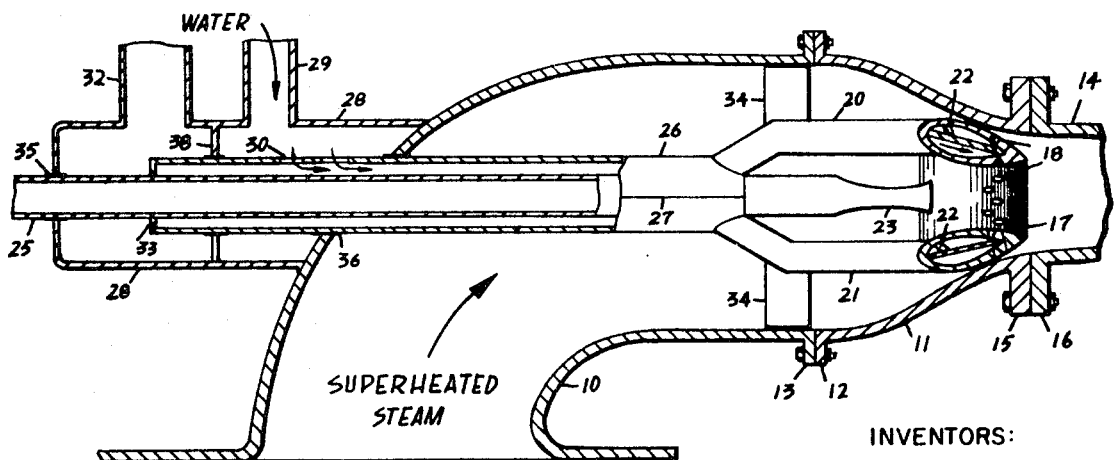
FIG. 1c shows the thermopresser shown in FIG. 1a arranged for ⅓-load operation.

Referring now to FIGS. 1a, 1b and 1c there is seen a thermopresser according too the present invention arranged for full, ⅔- and ⅓-load operation, respectively. These figures show a variable flow thermopresser including a feed section 10 through which superheated steam is admitted into the thermopresser body. Feed section 10 is connected to thermopresser inlet section 11 by flanges 12 and 13. Inlet section 11 is connected to diffuser section 14 by flanges 15 and 16. Diffuser section 14, which is shown broken away, consists of a gradually diverging, generally conical, tube.

Inlet section 11 and diffuser section 14 make up the thermopresser body. The narrowest portion of the thermopresser body, about at the location of flanges 15 and 16, is referred to as the thermopresser "throat."

Within inlet section 11 is located a toroidal manifold 17 having a plurality of small spray nozzles 18 therein, located to spray very fine droplets of water or other suitable liquid into the throat section of the thermopresser. Any suitable spray nozzles may be used. A variety of suitable nozzles are described in the above-noted copending application of D. P. Hines, Ser. No. 701,228, filed Jan. 29, 1968. Manifold 17 is divided into inner and outer sections by a generally ring-shaped divider 19. Water is delivered to manifold 17 through pipes 20 and 21. Diverters 22 are included in manifold 17 adjacent the connections to pipes 20 and 21 so that pipe 20 supplies water only to the inner section of manifold 17 while pipe 21 supplies water only to the outer section of manifold 17.

A jet pump nozzle 23 is located within manifold 17 on the centerline of the thermopresser. Driving fluid is supplied to jet pump nozzle 23 through feed pipe 25.

Water is supplied to pipes 20 and 21 through a divided cylindrical conduit 26 which surrounds feedpipe 25 and is secured thereto. Conduit 26 is divided along line 27 so that water which enters outer housing 28 through pipe 29 passes to pipe 20 through openings 30 and water which enters through pipe 32 passes to pipe 21 through opening 33.

Feedpipe 25 is mounted for axial movement along the thermopresser centerline. Manifold 17, pipes 20 and 21 and conduit 26 are secured to pipe 25 and move with it. A plurality of fins 34 guide the array during movement. Seals 35 and 36 serve as bearings for pipe 25 and conduit 26 where they pass through housing 28 and feed section 10, respectively. Guides 38 serve to guide conduit 26 during movement and to divide the water supply entering through pipes 29 and 32.

FIG. 1a shows the assembly during full flow operation. Superheated steam is entering at the maximum rate. Manifold 17 is in a position furthest from the walls of inlet section 11. The configuration at the wall of inlet section 11 is optimized for most efficient full flow operation. Water is fed to manifold 17 from pipes 29 and 32 at full system capacity. Typically, about one-third of the total water enters through pipe 29 while about two-thirds of the total water enters through pipe 32.

As flow of saturated steam through feed section 10 decreases, as for example where load on a turbine-generator decreases, manifold 17 is moved towards the walls of inlet section 12 and flow of water to manifold 17 decreases proportionately.

It has been found that where superheated steam flow is less than that for which the thermopresser throat cross-sectional area was optimized, the throat area should be decreased to retain operating efficiency. As manifold 17 approaches inlet section wall 11, a "choking" effect takes place, decreasing the effective throat area. Also, as superheated steam flow decreases, the quantity of water required decreases proportionately.

FIG. 1b shows the system arranged for most efficient operation where superheated steam is entering at about ⅔-full flow. Manifold 17 has been moved to the right until the throat cross-sectional area is again optimum. The shape of the inner and outer walls of manifold 17 may also be designed to give optimum flow characteristics over a wide range of steam flow rates. Pipe 29 still supplies water at about one-third of the full flow rate to the spray nozzles on the inner section of manifold 17. Flow of water through pipe 32 to the spray nozzles on the outer section of manifold 17 has been cut in half, from about two-thirds to about one-third of the full flow rate. Thus, when steam flow drops to ⅔-full flow, total waterflow is also decreased to about stream, -full flow (one-third through each of pipes 29 and 32).

FIG. 1c shows the system arranged for superheated steam flow at about ⅓-full flow. Here, manifold 17 has been moved to the right until it contacts the wall of inlet section 11. Now the inner wall of manifold 17 acts as a thermopresser inlet section of much decreased cross-sectional area. Pipe 29 still supplies water at the original rate, about one-third of the full waterflow rate. No water is supplied through pipe 32. Thus, throat area and water supply have decreased in proportion to the decrease in steam flow. Also, water is still being sprayed directly into the steam stream, only through the nozzles on the inner section of manifold 17.

This system is capable of smoothly varying output over a range of from one-third to full capacity. The system may be designed, of course, for a wider of narrower range.

Jet pump nozzle 23 and feedpipe 25 serve both as a system startup means (as detailed in the above-noted copending application Ser. No. 701,229) and as means for moving the manifold assembly axially within thermopresser inlet section 11. Waterflow and manifold position may be manually adjusted if desired. Where steam flow rate changes frequently, or where more accurate control is desired, valves in the water feedline and the manifold-positioning means may be motor driven under the control of a conventional controller which senses variations in steam flow.

Figure 2:
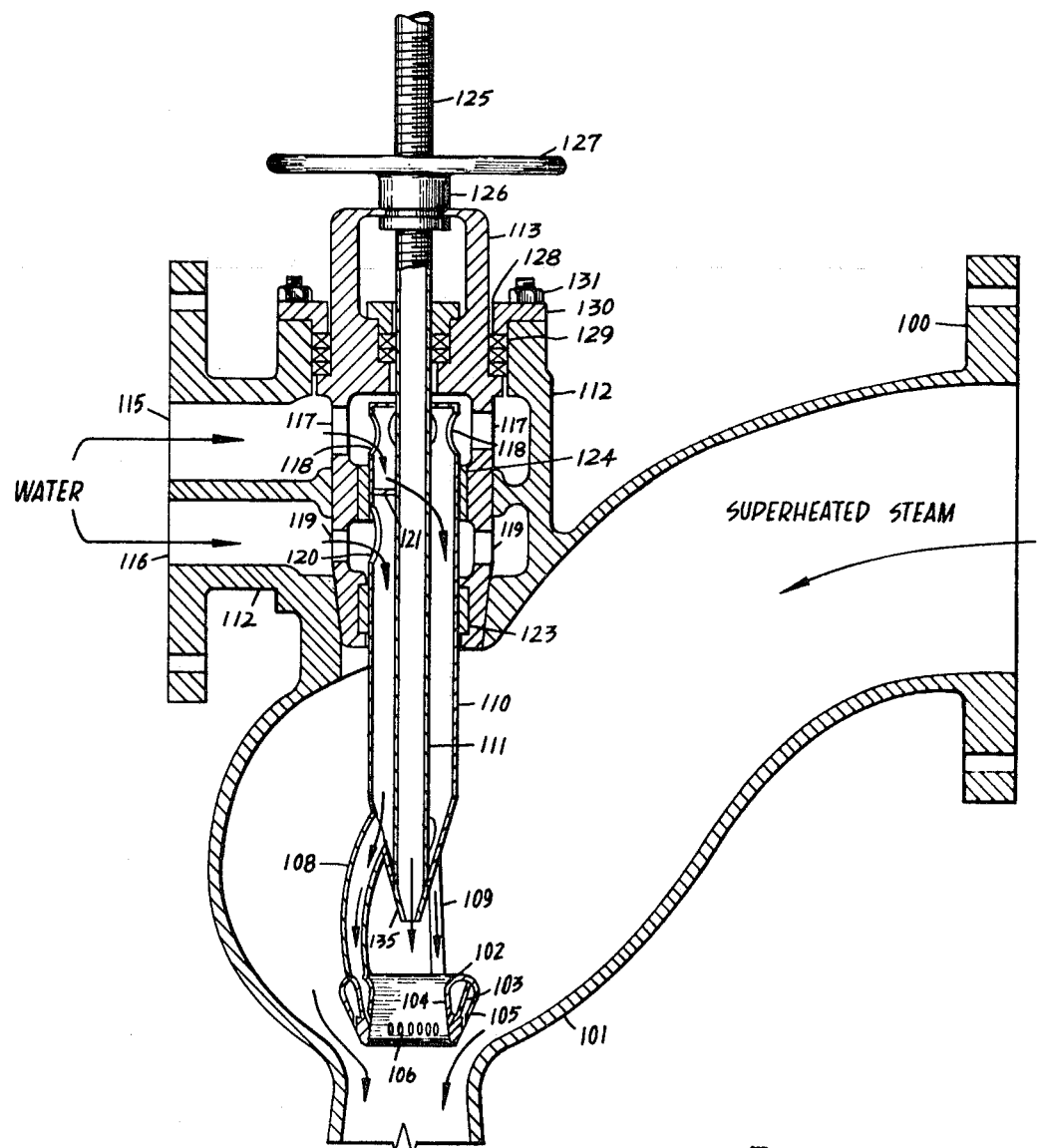
FIG. 2 shows a section through a preferred embodiment of a thermopresser according to this invention.
Figure 2:
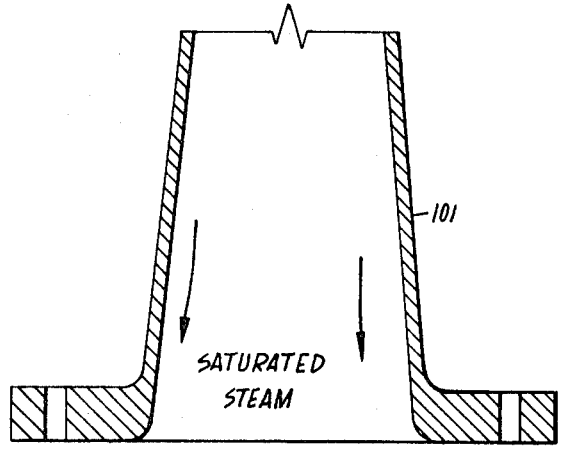

FIG. 2 shows an especially preferred embodiment of a variable flow thermopresser, partly in section.

The assembly is connected to a source of superheated steam by flange 100. Entering superheated steam passes to thermopresser 101 consisting of a converging inlet, a narrow throat and a diverging diffuser.

Located coaxially within the thermopresser inlet section is a toroidal manifold 102. While a single manifold is shown, two or more coaxial manifolds may be used if desired. A divider ring 103 within manifold 102 divides the manifold into inner and outer sections. A plurality of small spray nozzles 106 are located in inner wall 104 and outer wall 105.

Water is admitted into manifold 102 through three feedpipes evenly spaced around manifold 102. Only two of these feedpipes are seen in FIG. 2. Feedpipe 108 feeds water to the inner section of manifold 102. Feedpipe 109 feeds water to the outer section of manifold 102 as does the third feedpipe (not shown). These feedpipes receive feedwater from a conduit 110 which surrounds a jet pump nozzle supply pipe 111.

A housing 112 formed as an integral part of the thermopresser supports conduit 110 by means of a removable insert 113 and includes passages 115 and 116 through which feedwater is admitted. Water entering through passage 115 passes through openings 117 in insert 113, then through opening 118 into conduit 110. Water entering through passage 116 passes through openings 119 in insert 113, then through opening 120 into conduit 110. Conduit 110 is divided into two sections by transverse wall 121 and two axial walls (not shown) which serve to isolate a passage from opening 120 to feedpipe 108. The remainder of conduit 110 connects openings 118 to feedpipe 109 and the third feedpipe (not shown).

Conduit 110 is mounted for axial movement with pipe 111 over bearings 123 and 124 which also serve as seals. Slight water leakage past bearings 123 and 124 is not detrimental to system performance.

Supply pipe 111 bears external threads 125 along a portion just outside insert 113. Threads 125 are engaged by internal threads in a drive means 126. Drive means 126 is rotatably mounted on insert 113. Cooperating flanges on drive means 126 and insert 113 prevent axial movement of drive means 126. Thus, as drive means 126 is rotated, as by handwheel 127, supply pipe and the manifold assembly are moved axially.

Leakage around supply pipe 111 and insert 113 is prevented by packing 128 and 129, respectively. Insert 113 is held in place by bushing 130 which is fastened to housing 112 by studs and nuts 131 and which bears on packing 129.

In operation, a full steam flow through the thermopresser, manifold 102 is positioned at an optimum distance from the thermopresser throat and water is sprayed from spray nozzles 106 at the full design rate. Preferably, in the embodiment shown, one-third of the full waterflow is introduced through feedpipe 108 and the inner spray nozzles while two-thirds of the water is introduced through feedpipe 109 and the third feedpipe (not shown) and the outer spray nozzles. As steam flow decreases, flow of water to the outer spray nozzles is decreased proportionately. Simultaneously, manifold 102 is moved towards the thermopresser throat to maintain an optimum throat cross-sectional area. When steam flow has dropped to about one-third of full flow, manifold 102 will be in contact with the thermopresser throat and no water will be sprayed from the outer spray nozzles.

Supply pipe 111 serves to support conduit 110, act as part of the manifold drive assembly and also to supply driving fluid to jet pump nozzle 135 during system startup.

While throughout the above discussion, the injection of water droplets into a superheated steam stream has been described, it should be remembered that the invention will function with the injection of other liquids into other hot gas streams. For example, water, alcohol or a mixture thereof might be injected into gas turbine exhaust gases passing through a thermopresser to increase turbine efficiency. However, the water-steam system is highly preferred because of the unique and surprisingly high conversion efficiency obtained in the steam thermopresser. In electric powerplants in which turbines are driven by superheated steam, where the steam is produced in a fossil-fired or nuclear steam-supply system, it is generally necessary to pump large quantities of saturated steam through the superheater. The steam thermopresser is uniquely capable of producing large quantities of high-pressure saturated steam and of driving this steam through the superheater.

The variable flow of thermopresser system of this invention has special utility in steam-cooled nuclear reactors which supply superheated steam to a turbine-generator set or other load. A typical nuclear powerplant is shown schematically in FIG. 3.

The nuclear powerplant includes, basically, a nuclear reactor 200 to supply superheated steam to turbine 201. Reactor 200 includes an upright cylindrical pressure vessel 202 closed at the bottom by a dish-shaped lower head 203 and at the top by a removable dome-shaped upper head 204.

Within pressure vessel 202 is located the core 205 containing nuclear fuel material in a heat-generating arrangement. Heat output of core 205 is controlled by a plurality of control rods, one of which is schematically indicated at 208. Vertical openings through core 205, generally indicated at 206 and 207, permit coolant to pass through the core and remove heat therefrom.

Core 205 is located within a shroud 210 which is mounted on lower head 203. Within shroud 210 and below core 205 is located an inlet plenum 211 in which substantially saturated steam collects before passing through core 205. Also within shroud 210, above core 205, is located an outlet plenum 212 to which the now superheated steam passes from the core.

A portion of the superheated steam in outlet plenum 212 passes upwardly through pipe 213 turbine 201. Turbine 201 drives generator 214 to produce electrical power. The steam is condensed in main condenser 215 and pumped by condensate pump 216 to storage tank 217.

Figure 3:
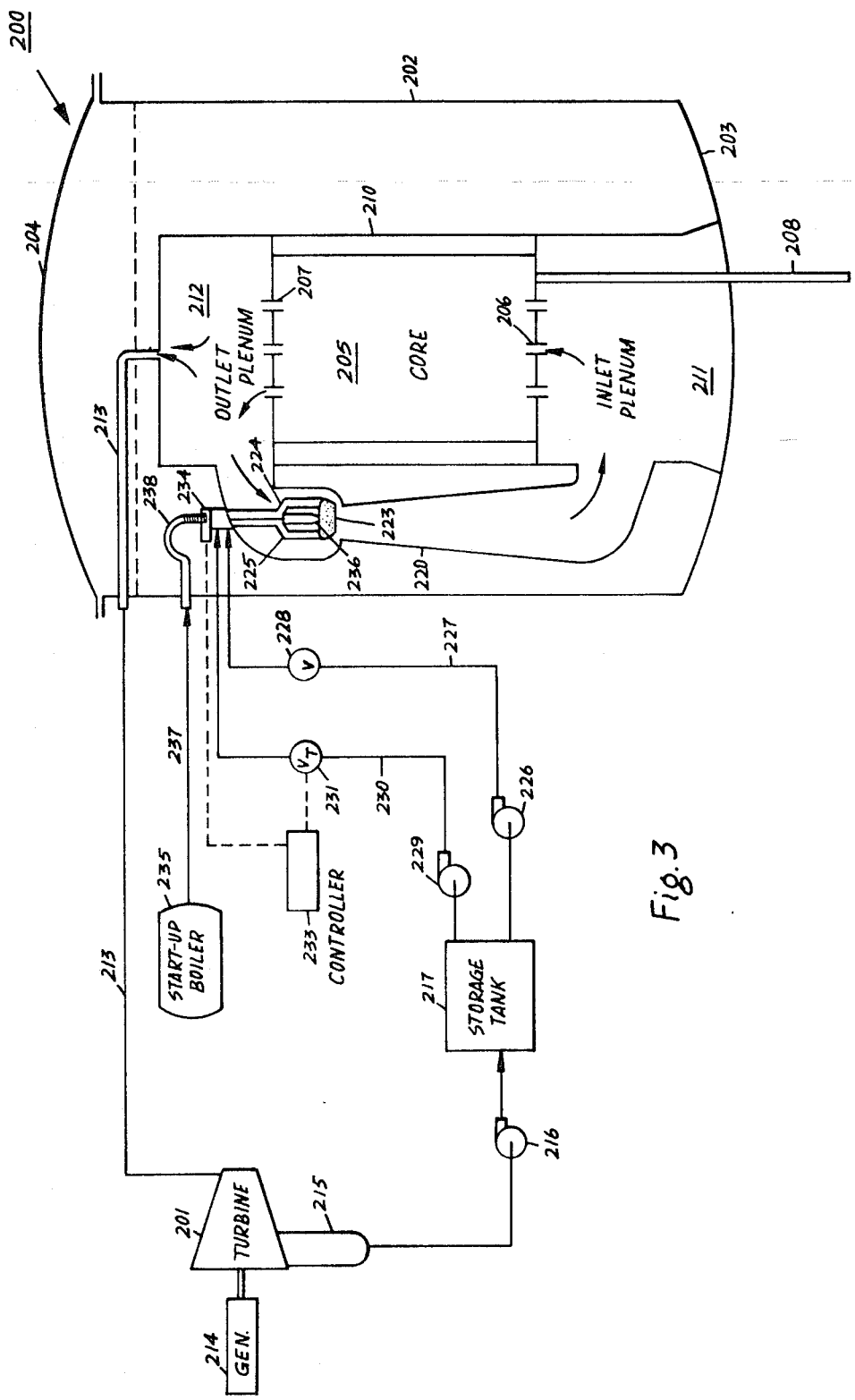
FIG. 3 shows a preferred arrangement in a nuclear powerplant of the thermopresser of this invention.

A plurality of steam thermopressers are located in a water-filled annulus between shroud 210 and the inner wall of pressure vessel 202. Only one of these thermopressers is shown in FIG. 3 for clarity. Thermopresser 220 is positioned to receive superheated steam from outlet plenum 212 and return substantially saturated steam to inlet plenum 211. Axially movable manifold 223 is supplied by two water feedpipes 224 and 225. This arrangement is similar to that shown in FIGS. 1a, 1b and 1c. About one-third of the full waterflow rate is pumped by pump 226 through line 227 and valve 228 at a constant rate to the inner spray nozzles on manifold 223. Pump 229 pumps water through line 230 and throttle valve 231 to the outer spray nozzles on manifold 223. Throttle valve 231 controls waterflow from no flow up to about two-thirds of the total waterflow Controller 233 senses steam flow through thermopresser 220 and adjusts throttle valve 231 and operates drive means 234 to adjust the position of manifold 223 relative to the thermopresser throat.

A startup boiler 235 is provided to provide steam to jet pump nozzle 236 through pipe 237. Flexible section 238 in pipe 237 permits movement as the manifold position is adjusted. Of course, other devices, such as telescoping pipe sections, may be used in place of flexible section 238 to allow movement of manifold 223 while maintaining the fluid supply connection between line 237 and jet pump nozzle 236.

As the load varies, the amount of steam leaving outlet plenum 212 to turbine 201 will vary. When load decreases, control rods are moved into the core decreasing the core heat output. Steam circulation through the thermopresser decreases, so controller 233 partially closes throttle valve 231 and moves manifold 223 towards the thermopresser throat. When the load increases, more steam is required, so controller 233 moves manifold 223 back while permitting more water to pass through valve 231. Thus steam circulation is easily varied and thermopresser 220 operates efficiently at all times.

Although specific arrangements and proportions have been described above, other suitable arrangements and components may be used, as indicated above, with similar results.

Other modifications and ramifications of the present invention will occur to those skilled in the art upon reading the present disclosure. These are intended to be included within the scope of this invention.

We claim:

1. In a nuclear powerplant comprising a nuclear reactor including a nuclear chain-reacting core through which substantially saturated steam flows to be superheated; means to pass a first portion of the superheated steam to a load where said superheated steam performs useful work and is condensed; means to pass the remainder of the superheated steam through a thermopresser; toroidal manifold means within said thermopresser having spray means through which condensate is sprayed into said superheated steam in said thermopresser and means to pass the resulting large quantity of substantially saturated steam back to said core; the improvement comprising means to vary the position of said manifold along the thermopresser axis and means to vary the quantity of water sprayed into said thermopresser in accordance with the quantity of superheated steam passing through said thermopresser.

2. The powerplant of claim 1 wherein said thermopresser includes means for feeding water at a constant rate to spray nozzles on the inner side of said manifold and means for feeding water to spray nozzles on the outer side of said manifold at a variable rate in proportion to superheated steam flow through said thermopressor.